(12) United States Patent
Goldstein

(10) Patent No.: US 12,013,305 B2
(45) Date of Patent: Jun. 18, 2024

(54) MODAL LAUNCH CONDITION USING BEND-INSENSITIVE MULTIMODE FIBER

(71) Applicant: Fluke Corporation, Everett, WA (US)

(72) Inventor: Seymour Goldstein, Austin, TX (US)

(73) Assignee: Fluke Corporation, Everett, WA (US)

( * ) Notice: Subject to any disclaimer, the term of this patent is extended or adjusted under 35 U.S.C. 154(b) by 164 days.

(21) Appl. No.: 17/397,593

(22) Filed: Aug. 9, 2021

(65) Prior Publication Data

US 2023/0042707 A1 Feb. 9, 2023

(51) Int. Cl.
G01M 11/00 (2006.01)
G02B 6/42 (2006.01)

(52) U.S. Cl.
CPC .......... G01M 11/33 (2013.01); G02B 6/4203 (2013.01); G02B 6/4286 (2013.01)

(58) Field of Classification Search
CPC ..... G01M 11/33; G02B 6/4203; G02B 6/4286
See application file for complete search history.

(56) References Cited

U.S. PATENT DOCUMENTS

| | | | | |
|---|---|---|---|---|
| 4,979,793 A * | 12/1990 | Bowen | ............. | G02B 6/4246 250/227.16 |
| 7,787,731 B2 * | 8/2010 | Bookbinder | ......... | G02B 6/0288 385/127 |
| 9,036,137 B2 * | 5/2015 | Goldstein | ............ | G01M 11/088 356/73.1 |
| 2011/0064367 A1 * | 3/2011 | Molin | ................. | G02B 6/0288 385/100 |
| 2011/0096563 A1 | 4/2011 | Levin et al. | | |
| 2012/0308184 A1 * | 12/2012 | Pina | ..................... | G02B 6/4465 385/102 |
| 2014/0226151 A1 * | 8/2014 | Bennett | ................ | G01M 11/338 356/73.1 |

(Continued)

FOREIGN PATENT DOCUMENTS

CN 205691318 U * 11/2016
JP 2016153733 A 8/2016

OTHER PUBLICATIONS

"Fiber Optic Adapters / Couplers", 2015, Fiber Optic Cable Shop Est. 1976, p. 1 (Year: 2015).*

(Continued)

*Primary Examiner* — Tarifur R Chowdhury
*Assistant Examiner* — Kemaya Nguyen
(74) *Attorney, Agent, or Firm* — Seed IP Law Group LLP

(57) ABSTRACT

A fiber optic test device is provided that includes a light source pigtailed with a first end of a non-bend insensitive multimode fiber (non-BIMMF). A second end of the non-BIMMF is fusion spliced to a first end of a reference grade bend insensitive multimode fiber (BIMMF). A reference grade optical fiber connector is attached to a second end of the BIMMF, which is coupled to a first end of a reference grade bulkhead adapter. The non-BIMMF is deformed so that a specific launch condition, such as encircled flux, is achieved at the first end of the BIMMF. A test reference cord, which contains a reference grade BIMMF having similar geometric properties as the BIMMF that is fusion spliced to the non-BIMMF, is attached to a second end of the bulkhead adapter. Modal transparency is achieved and the launch condition is maintained at the output of the test reference cord.

16 Claims, 6 Drawing Sheets

(56) References Cited

U.S. PATENT DOCUMENTS

2018/0131437 A1    5/2018   Ruchet
2019/0049659 A1    2/2019   Chen et al.
2021/0124136 A1    4/2021   Bolhaar et al.

OTHER PUBLICATIONS

International Search Report mailed Nov. 18, 2022, for International Application No. PCT/US2022/039719. (3 pages).

* cited by examiner

| BIMMF | Ranges |
|---|---|
| Core = 50 ± 0.5 μm | |
| Core diameter maximum | 50.5 μm |
| Core diameter minimum | 49.5 μm |
| NA = 0.200 ± 0.002 μm | |
| NA maximum | 0.202 |
| NA minimum | 0.198 |

*FIG. 4A*

| Wavelength (nm) | 850 |
|---|---|
| Fiber core radius (μm) | 25.25 |
| Numerical Aperture | 0.198 |
| V | 36.94 |

Modes 341

*FIG. 4B*

| Wavelength (nm) | 850 |
|---|---|
| Fiber core radius (μm) | 24.75 |
| Numerical Aperture | 0.202 |
| V | 36.94 |

Modes 341

*FIG. 4C*

MODAL LAUNCH CONDITION USING BEND-INSENSITIVE MULTIMODE FIBER

BACKGROUND

Technical Field

The present disclosure relates to testing of optical cabling, and more particularly to achieving a desired modal launch condition during testing of optical cabling by controlling a number of launched mode groups in bend-insensitive multimode fiber (BIMMF).

Description of the Related Art

During testing of installed multimode optical cabling, controlling the launch condition from a light source dramatically improves measurement repeatability. The launch condition described in International Electrotechnical Commission (IEC) standards such as IEC 61300-4-1 is called encircled flux (EF). The EF launch condition is defined to represent the worst case Vertical-Cavity Surface-Emitting Laser (VCSEL) launch expected from a high-speed transceiver.

BRIEF SUMMARY

The present disclosure teaches fiber optic test methods, devices, and systems that can achieve a desired launch condition using enhanced macro bend loss multimode fiber (e.g., BIMMF). In addition, the present disclosure teaches fiber optic test methods, devices, and systems that enable a test reference cord to be replaced without replacing a linear variable mandrel that is mounted to the test reference cord.

A method of achieving a desired launch condition according to the present disclosure may be characterized as including: optically coupling a light source module to a mode controller assembly that includes a non-bend-insensitive multimode fiber (non-BIMMF) positioned on a linear variable mandrel, selectively bending the non-BIMMF to output a desired number of modes of light from the mode controller assembly, optically coupling an optical fiber adapter to the mode controller assembly using a first bend-insensitive multimode fiber (first BIMMF), and outputting the desired number of modes of light from the optical fiber adapter.

The light source module and the light source module may be mounted inside of a housing. The light source module and the mode controller assembly may be mounted to a printed circuit board disposed inside of the housing.

The selectively bending of the non-BIMMF may include moving a plunger to selectively deform the non-BIMMF to output the desired number of modes of light from the mode controller assembly.

The optically coupling the optical fiber adapter to the mode controller may include optically coupling the optical fiber adapter to an optical fiber connector that is optically coupled to the mode controller, and the method may further include optically coupling an encircled flux measurement instrument to the optical fiber adapter, and monitoring, by the encircled flux measurement instrument, a launch condition output from the optical fiber adapter, and the selectively bending of the non-BIMMF may be based on the launch condition.

The method may further include coupling a test reference cord to the optical fiber adapter, the test reference cord including a second bend-insensitive multimode fiber (second BIMMF) having a diameter of 50±0.5 μm and a numerical aperture of 0.200±0.002, and two optical fiber connectors each having a loss of <0.1 dB, and outputting the desired number of modes of light from the test reference cord. The non-BIMMF may have a diameter of 50±1 μm, the first BIMMF may have a diameter of 50±0.5 μm and a numerical aperture of 0.200±0.002, the non-BIMMF and the first BIMMF may be fusion spliced together, and the optical fiber adapter may have a loss of <0.1 dB.

The method may further include optically coupling a test reference cord to the optical fiber adapter, optically coupling a cable under test to the test reference cord, optically coupling an optical power meter to the cable under test, and measuring, by the optical power meter, attenuation of light output from the cable under test.

A fiber optic test device according to the present disclosure may be characterized as including: a light source module, a mode controller assembly optically coupled to the light source module, the mode controller assembly including a non-bend-insensitive multimode fiber (non-BIMMF) positioned on a linear variable mandrel for selective bending of the non-BIMMF to output a desired number of modes of light from the mode controller assembly, and an optical fiber adapter optically coupled to the non-BIMMF of the mode controller assembly using a first bend-insensitive multimode fiber (first BIMMF), which outputs the desired number of modes of light.

The fiber optic test device may include a housing in which the light source module is mounted. The mode controller assembly also may be mounted inside of the housing. A printed circuit board may be disposed inside of the housing, and the light source module and the mode controller assembly may be mounted to the printed circuit board.

The linear variable mandrel may include a plunger configured to adjustably deform the non-BIMMF to output the desired number of modes of light from the mode controller assembly.

The fiber optic test device may include a test reference cord coupled to the optical fiber adapter, the test reference cord may include a second bend-insensitive multimode fiber (second BIMMF) having a diameter of 50±0.5 μm and a numerical aperture of 0.200±0.002, and two optical fiber connectors each having a loss of <0.1 dB. The non-BIMMF may have a diameter of 50±1 μm, the first BIMMF may have a diameter of 50±0.5 μm and a numerical aperture of 0.200±0.002, and the non-BIMMF and the first BIMMF may be fusion spliced together.

A fiber optic test system according to the present disclosure may be characterized as including: a fiber optic test device and a test reference cord. The fiber optic test device includes a light source module, a mode controller assembly optically coupled to the light source module, the mode controller assembly including a non-bend-insensitive multimode fiber (non-BIMMF) positioned on a linear variable mandrel for selective bending of the non-BIMMF to output a desired number of modes of light from the mode controller assembly, and an optical fiber adapter optically coupled to the non-BIMMF of the mode controller assembly using a first bend-insensitive multimode fiber (first BIMMF), which outputs the desired number of modes of light. The test reference cord is coupled to the optical fiber adapter, and includes a second bend-insensitive multimode fiber (second BIMMF).

The fiber optic test device may include a housing, and the light source module and the mode controller assembly may be mounted inside of the housing. A printed circuit board may be disposed inside of the housing, and the light source module and the mode controller assembly may be mounted to the printed circuit board.

The linear variable mandrel may include a plunger configured to adjustably deform the non-BIMMF to output the desired number of modes of light from the mode.

The test reference cord may include two optical fiber connectors coupled to the second BIMMF, the non-BIMMF may have a diameter of 50±1 µm, each of the first BIMMF and the second BIMMF may have a diameter of 50±0.5 µm and a numerical aperture of 0.200±0.002, each of the optical fiber adapter and the optical fiber connectors may have a loss of <0.1 dB, and the non-BIMMF and the first BIMMF may be fusion spliced together.

The fiber optic test system may include an optical power meter including an optical fiber adapter configured to be optically coupled to a cable under test that is optically coupled to the test reference cord.

BRIEF DESCRIPTION OF THE SEVERAL VIEWS OF THE DRAWINGS

FIGS. 4A, 4B, and 4C are charts showing properties of reference grade bend-insensitive multimode fiber (BIMMF) according to one or more embodiments of the present disclosure.

DETAILED DESCRIPTION

Figure 1:
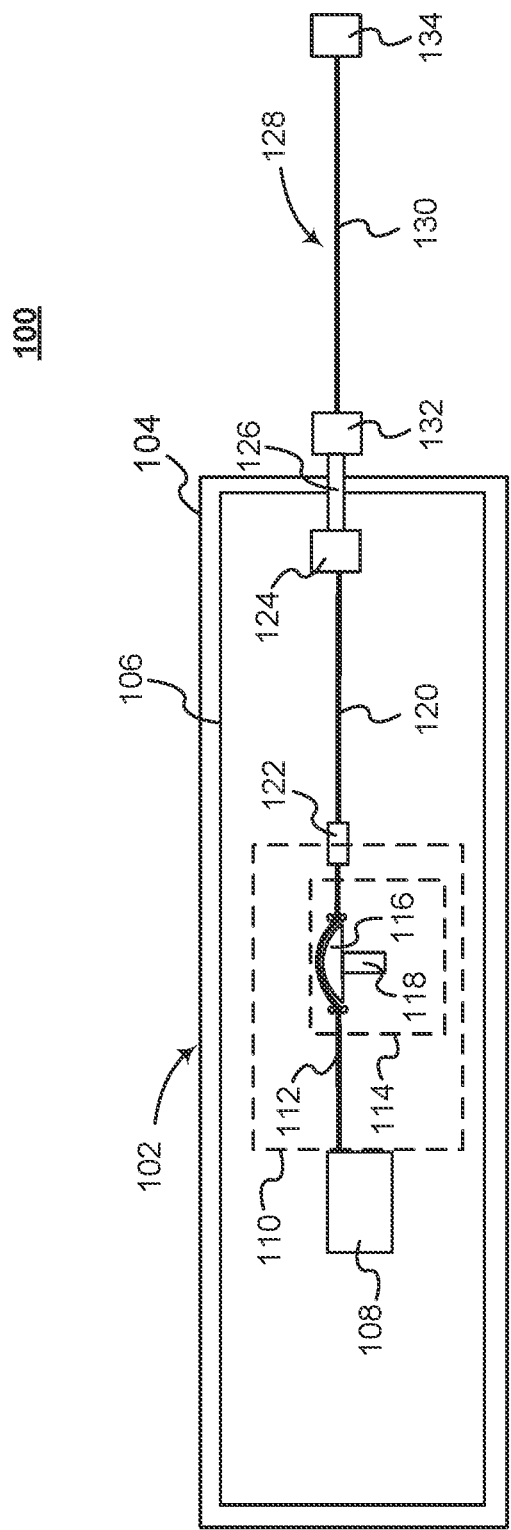
FIG. 1 is a diagram of a fiber optic test system according to one or more embodiments of the present disclosure.

One way to achieve an encircled flux launch condition is by bending multimode fiber while measuring the response with lab equipment capable of measuring modal power density. Conventionally, during testing of installed multimode optical cabling, a traditional multimode fiber (i.e., non-bend-insensitive multimode fiber (non-BIMMF)) included in a test reference cord is bent around a linear variable mandrel to implement a mode filter that reduces a number of modes of light output from the test reference cord to the cabling under test, in order to achieve a desired launch condition described in standards from the International Electrotechnical Commission (IEC). One or more of the connectors of the test reference cord may wear out after it is connected to a large number of optical cables during such testing, which requires replacement of the entire test reference cord, including the linear variable mandrel. Test reference cords according to embodiments of the present disclosure advantageously do not include a linear variable mandrel, which can reduce the cost of the test reference cords.

In addition, test reference cords according to embodiments of the present disclosure advantageously do not include traditional multimode fiber (i.e., non-BIMMF), which is becoming obsolete and increasingly scarce. It may not be possible to manufacture conventional test reference cords in the future if traditional tight tolerance multimode fiber (i.e., non-BIMMF) as defined in IEC optical interface standards and now in testing standards cannot be obtained. Test reference cords according to the present disclosure advantageously use enhanced macro bend loss multimode fiber (e.g., bend-insensitive multimode fiber (BIMMF)), which has become preferable over traditional multimode fiber (i.e., non-BIMMF).

Enhanced macro bend loss multimode fiber (e.g., BIMMF) has a different structure than non-BIMMF. In traditional tight tolerance multimode fiber (e.g., non-BIMMF), the glass consists of a core and cladding, each having a different index of refraction. In contrast, enhanced macro bend loss multimode fiber (e.g., BIMMF) has a specially engineered optical "trench" added between the core and cladding. This trench contains the propagating modes within the fiber core, even in an extreme bend. Because enhanced macro bend loss multimode fiber (e.g., BIMMF) is more impervious to bend loss than traditional multimode fiber (i.e., non-BIMMF), it is not well suited to be bent around a linear variable mandrel to implement a mode filter, for example, in a test reference cord. In other words, a mode filter (mandrel) cannot be practically applied to BIMMF. Fiber optic test methods, devices, and systems according to the present disclosure advantageously achieve a desired launch condition when using enhanced macro bend loss multimode fiber (e.g., BIMMF) in test reference cords.

Small changes in core diameter and numerical aperture can alter the number of mode groups transmitted through segments of multimode fibers that are optically coupled together. In addition, misalignment of the cores of multimode fibers in an optical fiber connector can alter the number of mode groups transmitted through the fibers. Encircled flux (EF) is a way to consistently control the number of mode groups launched out of the fibers. A light source module according to the present disclosure can achieve the EF launch condition while using bend-insensitive multimode fiber (BIMMF) in test reference cords. To do this, tightly controlled core diameter (e.g., 50±0.5 µm) and numerical aperture (e.g., 0.200±0.002) multimode fiber is used, which is reference grade. In addition, reference grade optical fiber connectors having low fiber core center lateral mismatch and, thus, low loss are used. By maintaining reference grade conditions from the output of a mandrel wrap to the end of a test reference cord, modal transparency can be maintained while satisfying requirements of test standards, for example, from the IEC.

FIG. 1 is a diagram of a fiber optic test system 100 according to one or more embodiments of the present disclosure. The fiber optic test system 100 includes a fiber optic test device 102 having a housing 104 in which a printed circuit board 106 is disposed. The housing 104 may be made of a hard plastic material, and may completely enclose the printed circuit board 106 and components mounted thereon.

A light source module 108 is mounted (e.g., using solder) on the printed circuit board 106, which includes conductors electrically coupled to a power supply (not shown), such as one or more batteries, that provides electrical power to the light source module 108. In one or more embodiments, the light source module 108 includes a dual wavelength Light Emitting Diode (LED) device, including one LED that outputs light having a wavelength of 850 nm, and one LED that outputs light having a wavelength of 1320 nm.

Although not illustrated in FIG. 1, additional electronic components may be mounted on the printed circuit board 106. For example, a controller may be mounted on the printed circuit board 106, wherein the controller includes a processor and a memory storing instructions that cause the processor to control the light source module 108 in response to operation of one or more user inputs (not shown), for example, provided on the housing 104.

In one or more embodiments, a mode controller assembly 110 is mounted (e.g., using an adhesive material) on the printed circuit board 106. The mode controller assembly 110 includes a non-bend-insensitive multimode fiber (non-BIMMF) 112 positioned on a linear variable mandrel 114, which varies a bend radius of the non-BIMMF 112 to provide tuning of a mode distribution within the non-BIMMF 112. That is, the linear variable mandrel 114 is for selective bending of the non-BIMMF 112 to output a desired number of modes of light from the mode controller assembly 110.

In one or more implementations, the non-BIMMF 112 is contained within a plastic 900 μm buffer and is just long enough (e.g., 150 mm to 175 mm) to allow a half-turn tight fiber bend around a plunger 116 of the linear variable mandrel 114. In one or more implementations, the non-BIMMF 112 is an optical fiber having a diameter of 50±1 μm. In one or more implementations, the non-BIMMF 112 is a reference grade optical fiber having a diameter of 50±0.5 μm and a numerical aperture of 0.200±0.002.

The plunger 116 operates as a half turn mandrel acting upon the non-BIMMF 112. Because the plunger 116 is adjustable, the plunger 116 forms a linear variable mandrel (i.e., linear variable mandrel 114), wherein the term "linear" implies that the plunger 116 moves along a linear path to impart less or more bending on the non-BIMMF 112. The plunger 116 of the linear variable mandrel 114 has a concave down curved surface that abuts the non-BIMMF 112. The plunger 116 is coupled (e.g., using an adhesive material) to an actuator 118 that can move the plunger 116 toward and away from the non-BIMMF 112. Movement of the plunger 116 toward the non-BIMMF 112 causes the plunger 116 to increasingly deform the non-BIMMF 112 and thereby reduces a number of modes of light exiting the non-BIMMF 112. Similarly, movement of the plunger 116 away from the non-BIMMF 112 causes the plunger 116 to decrease or stop deformation of the non-BIMMF 112 and thereby increases the number of modes of light exiting the non-BIMMF 112. Accordingly, the plunger 116 may be moved in order to cause a desired number of modes of light to be output from the mode controller assembly 110. The actuator 118 shown in FIG. 1 is merely an example, and other types of manual or automatic actuators could be used.

In one or more embodiments, the mode controller assembly 110 is configured in a manner that is similar to the mode filter shown in FIG. 7 of U.S. Pat. No. 9,036,137, which is incorporated by reference in its entirety herein. For example, the mode controller assembly 110 may be a miniaturized version of the mode filter shown in FIG. 7 of U.S. Pat. No. 9,036,137.

The light source module 108 is optically coupled (e.g., pigtailed) to a first end of the non-BIMMF 112 such that the non-BIMMF 112 receives a light output from the light source module 108. A second end of the non-BIMMF 112 is fusion spliced to a first end of a bend-insensitive multimode fiber (BIMMF) 120 at a junction 122. A fusion splice typically has very low loss (e.g., 0.02 dB). In one or more implementations, the BIMMF 120 has a 900 μm buffer jacket, a length of 0.5 m, and is mounted (e.g., using a wire saddle—Richo plastics) on the printed circuit board 106. A second end of the BIMMF 120 includes a reference grade optical fiber connector 124, which has a loss of <0.1 dB. In one or more embodiments, the optical fiber connector 124 is a reference grade FC/PC fiber connector.

The reference grade optical fiber connector 124 is coupled to one end of a reference grade optical fiber adapter 126 (e.g., using a zirconia split sleeve). In one or more embodiments, the reference grade optical fiber connector 124 is a FC bulkhead connector, which has been standardized by the Telecommunications Industry Association (TIA) in fiber optic connector intermateability standard EIA/TIA-604-4, and has been shown to produce the best alignment for matched fiber cores. The reference grade optical fiber adapter 126 has a loss of <0.1 dB. In one or more implementations, a first end of the optical fiber adapter 126 is disposed inside of the housing 104, and a second end of the optical fiber adapter 126 is disposed outside of the housing 104 so that it can be coupled to a test reference cord 128.

The test reference cord 128 includes a bend-insensitive multimode fiber (BIMMF) 130 having optical characteristics that are similar or identical to the BIMMF 120. The test reference cord 128 also includes reference grade optical fiber connectors 132, 134 that are coupled to respective ends of the BIMMF 130, which may be protected with a ruggedized 3 mm outer jacket. In one or more implementation, the test reference cord 128 has a length of 2 m. The reference grade optical fiber connector 132 is configured to be coupled to the second end of the optical fiber adapter 126. The reference grade optical fiber connector 134 is configured to be coupled to a first end of a cable under test (not shown in FIG. 1). A second end of the cabling under test is coupled to an optical power meter (not shown in FIG. 1), such as the optical power meter included in the CertiFiber® Pro Optical Loss Test Set from Fluke Networks, for example.

Because the linear variable mandrel 114 is not mounted on the test reference cord 128, if the test reference cord 128 becomes damaged it can be replaced without replacing the linear variable mandrel 114, which can reduce the cost of performing testing on multimode fibers. In addition, because the linear variable mandrel 114 is not mounted on the test reference cord 128, the test reference cord 128 is lighter weight and less cumbersome than conventional test reference cords having a linear variable mandrel mounted thereon.

Figure 2:
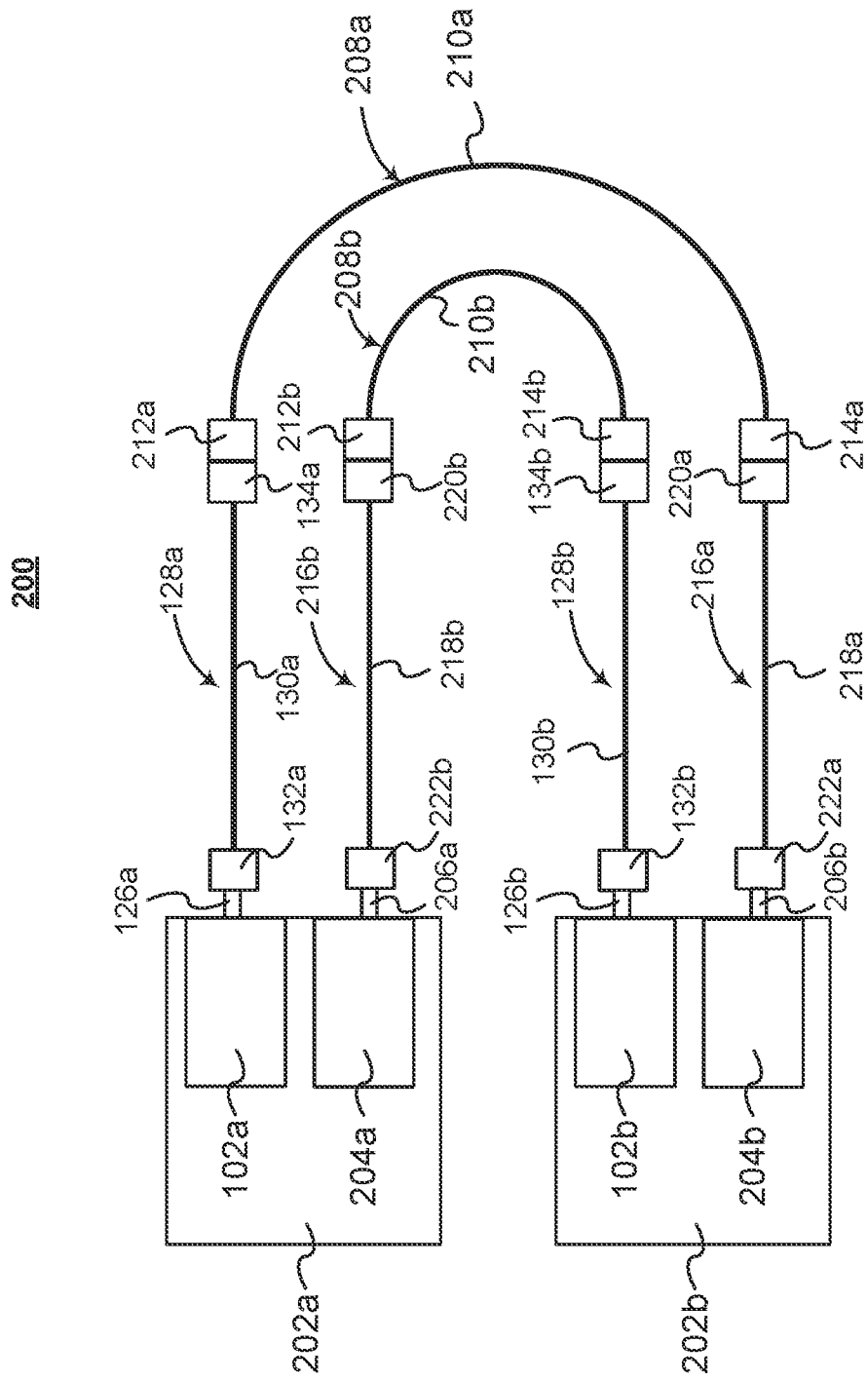
FIG. 2 is a diagram of a fiber optic test system according to one or more embodiments of the present disclosure.

FIG. 2 is a diagram of a fiber optic test system 200 according to one or more embodiments of the present disclosure. The fiber optic test system 200 includes a first fiber optic test device 202a, which includes a fiber optic test device 102a that is configured the same as the fiber optic test device 102 shown in FIG. 1. The first optic test device 202a also includes an optical power meter 204a that may be the same as the optical power meter included in the CertiFiber® Pro Optical Loss Test Set from Fluke Networks, for example. In addition, the fiber optic test system 200 includes a second fiber optic test device 202b, which includes a fiber optic test device 102b that is configured the same as the fiber optic test device 102 shown in FIG. 1, and an optical power meter 204b that is similar to the optical power meter 204a included in the first fiber optic test device 202a.

The first fiber optic test device 202a and the second fiber optic test device 202b are used to test a first cable under test 208a that includes a multimode fiber 210a having optical fiber connectors 212a, 214a coupled to respective ends of the multimode fiber 210a. The first fiber optic test device 202a is optically coupled to the first cable under test 208a using a first test reference cable 128a that includes a multimode fiber 130a having optical fiber connectors 132a, 134*a* coupled to respective ends of the multimode fiber 130*a*. More particularly, the optical fiber adapter 126*a* of the first fiber optic test device 202*a* is optically coupled to the optical fiber connector 132*a* of the first test reference cord 128*a*. The optical fiber connector 134*a* of the first test reference cord 128*a* is coupled to the optical fiber connector 212*a* of the first cable under test 208*a*. The first cable under test 208*a* is optically coupled to the second fiber optic test device 202*b* using a first test receive cord 216*a* that includes a multimode fiber 218*a* having optical fiber connectors 220*a*, 222*a* coupled to respective ends of the multimode fiber 218*a*. More particularly, the optical fiber connector 214*a* of the first cable under test 208*a* is coupled to the optical fiber connector 220*a* of the first test receive cord 216*a*. The optical fiber connector 222*a* of the first test receive cord 216*a* is coupled to an optical fiber adapter 206*b* that is optically coupled to the optical power meter 204*b* included in the second fiber optic test device 202*b*.

Similarly, the first fiber optic test device 202*a* and the second fiber optic test device 202*b* are used to test a second cable under test 208*b* that includes a multimode fiber 210*b* having optical fiber connectors 212*b*, 214*b* coupled to respective ends of the multimode fiber 210*b*. The second fiber optic test device 202*b* is optically coupled to the second cable under test 208*b* using a second test reference cable 128*b* that includes a multimode fiber 130*b* having optical fiber connectors 132*b*, 134*b* coupled to respective ends of the multimode fiber 130*b*. More particularly, the optical fiber adapter 126*b* of the second fiber optic test device 202*b* is optically coupled to the optical fiber connector 132*b* of the second test reference cord 128*b*. The optical fiber connector 134*b* of the second test reference cord 128*b* is coupled to the optical fiber connector 214*b* of the second cable under test 208*b*. The second cable under test 208*b* is optically coupled to the first fiber optic test device 202*a* using a second test receive cord 216*b* that includes a multimode fiber 218*b* having optical fiber connectors 220*b*, 222*b* coupled to respective ends of the multimode fiber 218*b*. More particularly, the optical fiber connector 212*b* of the second cable under test 208*b* is coupled to the optical fiber connector 220*b* of the second test receive cord 216*b*. The optical fiber connector 222*b* of the second test receive cord 216*b* is coupled to an optical fiber adapter 206*a* that is optically coupled to the optical power meter 204*a* included in the first fiber optic test device 202*a*.

In one or more embodiments, the first test reference cord 128*a*, the first test receive cord 216*a*, the second test reference cord 128*b*, and the second test receive cord 216*b* use the same type of multimode fiber. For example, the multimode fiber included in the first test reference cord 128*a*, the first test receive cord 216*a*, the second test reference cord 128*b*, and the second test receive cord 216*b* is BIMMF having a core diameter of 50±0.5 μm. In one or more embodiments, the first test reference cord 128*a*, the first test receive cord 216*a*, the second test reference cord 128*b*, and the second test receive cord 216*b* are provided by multiple suppliers, which makes the fiber optic test system 200 easier to use compared to fiber optic test systems that require test cords provided by a single supplier.

Figure 3:
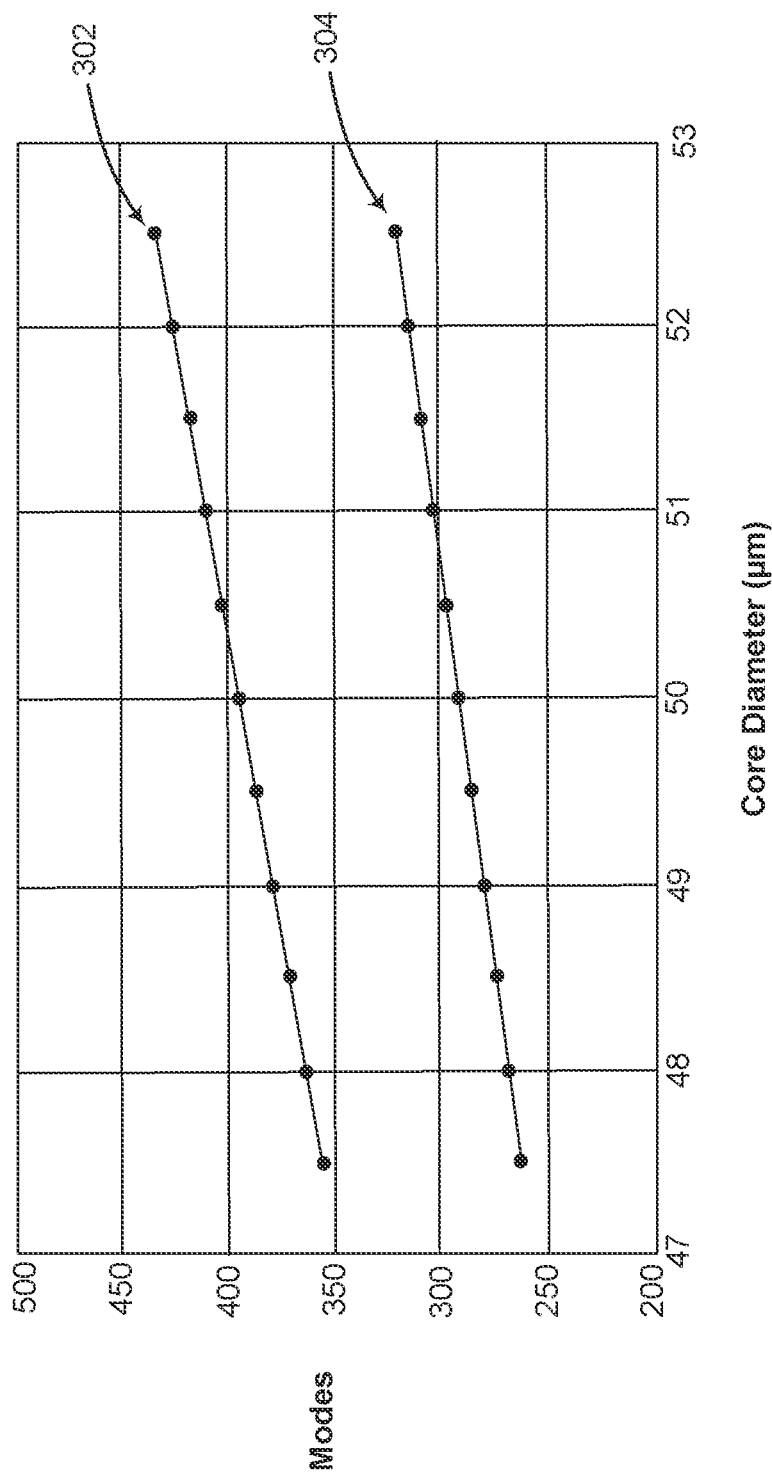
FIG. 3 is a graph showing number of modes versus core diameter for two standard grade multimode fibers having different numerical apertures.

FIG. 3 is a graph showing the number of modes versus core diameter for two standard grade multimode fibers having different numerical apertures. More particularly, FIG. 3 is a graph showing the number of modes versus core diameter for two standard grade multimode fibers having a core diameter of 50±2.5 μm and numerical apertures of 0.200±0.015, when illuminated with light having a wavelength of 850 nm. FIG. 3 includes a line 302 that passes through a number of data points for a first standard grade multimode fiber having a numerical aperture of 0.215 (i.e., 0.200+0.015). FIG. 3 also includes a line 304 that passes through a number of data points for a second standard grade multimode fiber having a numerical aperture of 0.185 (i.e., 0.200−0.015).

As shown in FIG. 3, as core diameter and numerical aperture vary, the number of supported mode groups (i.e., modes) changes. For example, at a core diameter of 50 the number of modes supported by the first standard grade multimode fiber is nearly 400 and the number of modes supported by the second standard grade multimode fiber nearly 300, wherein the difference in number of modes is almost 100. A 100-mode difference could contribute to a large error in measurement, perhaps 1 dB. Similarly, as core diameter and numerical aperture vary, encircled flux (EF) and insertion loss change. According to the present disclosure, a specific number of mode groups can be contained throughout concatenated fibers, from the output of the mode controller assembly 110 to a first connector of cabling under test, by controlling the optical fiber properties (e.g., core diameter and numerical aperture) of those fibers.

FIGS. 4A, 4B, and 4C are charts showing properties of reference grade bend-insensitive multimode fiber (BIMMF) according to one or more embodiments of the present disclosure. More particularly, FIG. 4A is a chart showing properties of reference grade bend-insensitive multimode fiber (BIMMF) having a core diameter of 50±0.5 μm and a numerical aperture of 0.200±0.002 FIG. 4B is a chart showing properties of a first BIMMF having a core radius of 25.25 μm (i.e., a core diameter of 50.5 μm) and a numerical aperture of 0.198 (i.e., 0.200−0.002), when illuminated with light having a wavelength of 850 nm. FIG. 4C is a chart showing properties of a second BIMMF having a core radius of 24.75 μm (i.e., a core diameter of 49.5 μm) and a numerical aperture of 0.202 (i.e., 0.200+0.002), when illuminated with light having a wavelength of 850 nm. As shown in FIGS. 4B and 4C, the same number of modes (i.e., 341) is supported by the first BIMMF and the second BIMMF. Thus, if core diameter and numerical aperture are restricted as to "reference grade fiber" values, the number of modes in the first BIMMF and the second BIMMF is matched. Accordingly, if the first BIMMF and the second BIMMF are optically coupled together using connectors each having a loss at that is very low (e.g. <0.1 dB), there is perfect modal transparency.

Prior to conducting a test of cabling under test, a technician (e.g., in a manufacturing facility) can couple an optical power meter or other test device capable of monitoring a launch condition to the optical fiber adapter 126 of the fiber optic test device 102. If the launch condition indicates that too many modes of light are being output from the optical fiber adapter 126, the technician can cause the actuator 118 to move the plunger 116 toward the non-BIMMF 112, which causes the plunger 116 to increasingly deform the non-BIMMF 112 and thereby reduce a number of modes of light exiting the mode controller assembly 110 through the optical fiber adapter 126. Similarly, if the launch condition indicates that too few modes of light are being output from the optical fiber adapter 126, the technician can cause the actuator 118 to move the plunger 116 away from the non-BIMMF 112, which causes the plunger 116 to decrease or stop deformation of the non-BIMMF 112 and thereby increase the number of modes of light exiting the mode controller assembly 110 through the optical fiber adapter 126. After the plunger 116 of the linear variable mandrel 114 is adjusted such that a desired number of modes of light are output from the mode controller assembly 110 through the optical fiber adapter 126, the fiber optic test device 102 may be used to test a cable under test.

During testing, a user connects the optical fiber connector 132 of the test reference cord 128 to the optical fiber adapter 126 of the fiber optic test device 102, for example, as shown in FIG. 1. Also, the user connects the optical fiber connector 134 of the test reference cord 128 to a first end of the cable under test. In addition, the user connects a second end of the cable under test to an optical power meter. The user then causes the light source module 108 to output light having a wavelength of 850 nm and to output light having a wavelength of 1320 nm, for example, by depressing one or more buttons or other inputs (not shown) of the fiber optic test device 102. The user may then observe a measured value or a message that is displayed by the optical power meter, for example, to determine whether the cable under test has passed or failed the test. For example, if the measured value indicates a loss that is less than a predetermined link budget, the user determines that the cable under test has passed the test. If the measured value indicates a loss that exceeds the predetermined link budget, the user determines that the cable under test has failed the test.

Figure 5:
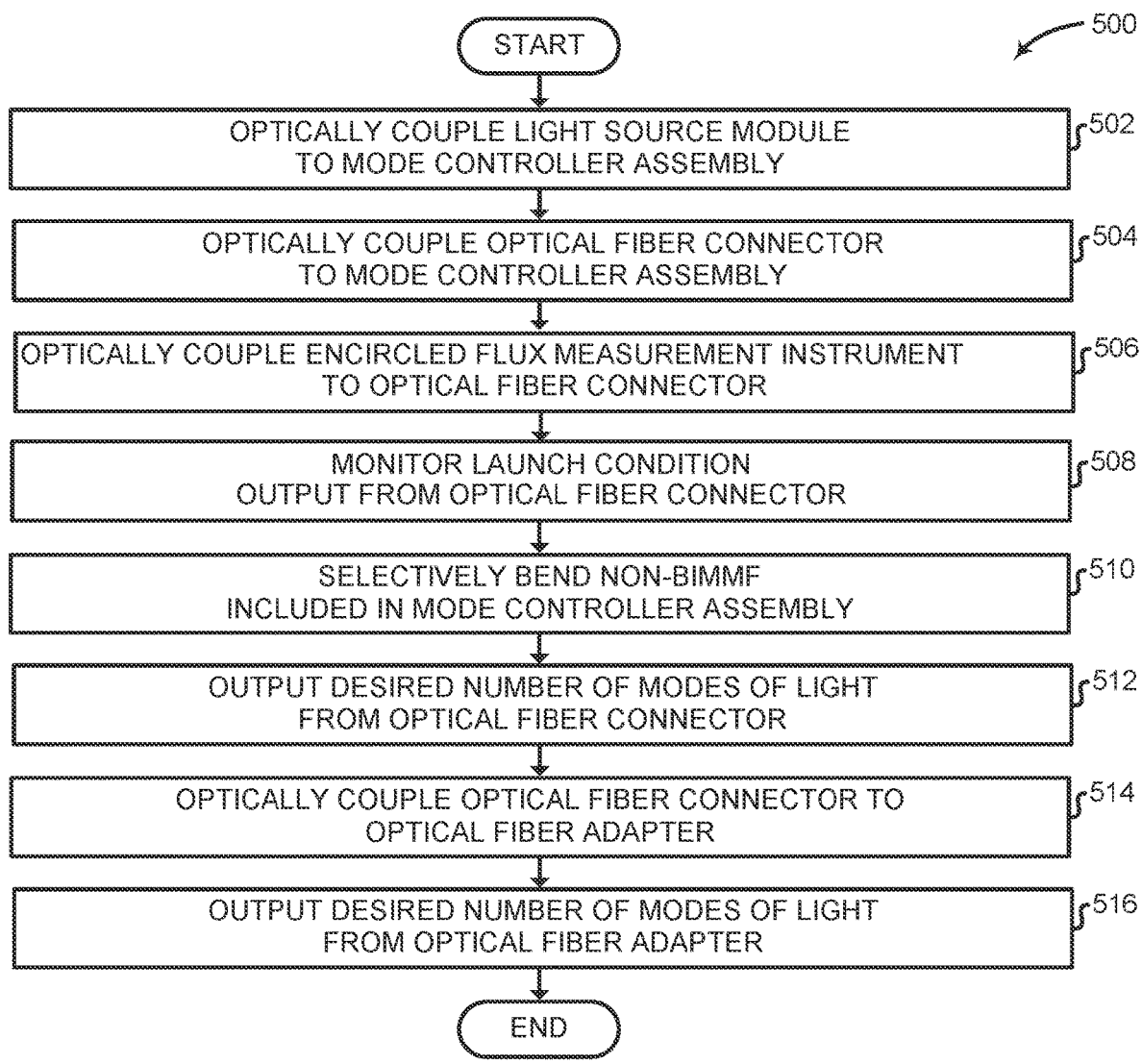
FIG. 5 is a flowchart of a method performed to monitor a launch condition using the fiber optic test system shown in FIG. 1 according to one or more embodiments of the present disclosure.

FIG. 5 is a flowchart of a method 500 performed to monitor a launch condition using the fiber optic test system 100 shown in FIG. 1 according to one or more embodiments of the present disclosure. For example, the method 500 is performed during factory tuning of the fiber optic test device 102 in which an encircled flux (EF) launch condition had been adjusted to be within a specific template. The method 500 begins at 502.

At 502, the light source module 108 of the optical test device 202 is optically coupled to the mode controller assembly 110 of the first optical test device 202. For example, a technician pigtails the light source module 108 with one end of the non-BIMMF 112. The method 500 then proceeds to 504.

At 504, the optical fiber connector 124 of the optical test device 202 is optically coupled to the mode controller assembly 110. For example, the technician optically couples a first end of the BIMMF 120 to the fiber connector 124, and fusion splices a second end of the BIMMF 120 to the end of the non-BIMMF 112 that is not pigtailed to the light source module 108. The method 500 then proceeds to 506.

At 506, an encircled flux measurement instrument is optically coupled to the optical fiber connector 124 of the optical test device 202. In one or more embodiments, the encircled flux measurement instrument is an MPX-1 Modal Explorer from Arden Photonics, which measures encircled flux as defined in FOTP-203 (TIA-455-203). For example, the technician disconnects the optical fiber connector 124 from the optical fiber adapter 126, and optically couples a fiber optic connector (not shown), which is optically coupled to the encircled flux measurement instrument (not shown), to the optical fiber connector 124 of the optical test device 202. The method 500 then proceeds to 508.

At 508, a launch condition output from the optical fiber connector 124 of the optical test device 202 is monitored using the encircled flux measurement instrument (not shown). For example, the technician causes light to be emitted from by the light source module 108 of the optical test device 202a and causes the encircled flux measurement instrument (not shown) to measure or monitor the launch condition output from the optical fiber connector 124 of the optical test device 202. The method 500 then proceeds to 510.

At 510, the non-BIMMF 112 included in the mode controller assembly 110 of the optical test device 202 is selectively bent. For example, the technician causes the plunger 116 of the linear variable mandrel 114 to move towards the non-BIMMF 112, which causes the plunger 116 to increasingly deform the non-BIMMF 112 and thereby reduce a number of modes of light exiting the non-BIMMF 112 to a desired number of modes of light. The method 500 then proceeds to 512.

At 512, the optical fiber connector 124 of the optical test device 202 outputs the desired number of modes of light. For example, after the technician selectively bends the non-BIMMF 112 using the plunger 116 until the desired number of modes of light is measured by the light source encircled flux measurement instrument, the technician controls the actuator 118 to keep the plunger 116 stationary so that a selective degree of bending of the non-BIMMF 112 is maintained. The method 500 then proceeds to 514.

At 514, the optical fiber connector 124 is optically coupled to the optical fiber adapter 126. For example, the technician physically connects the optical fiber adapter 126 to the optical fiber connector 124, which is optically coupled to the mode controller assembly 110 via the BIMMF 120. The method 500 then proceeds to 516.

Figure 6:
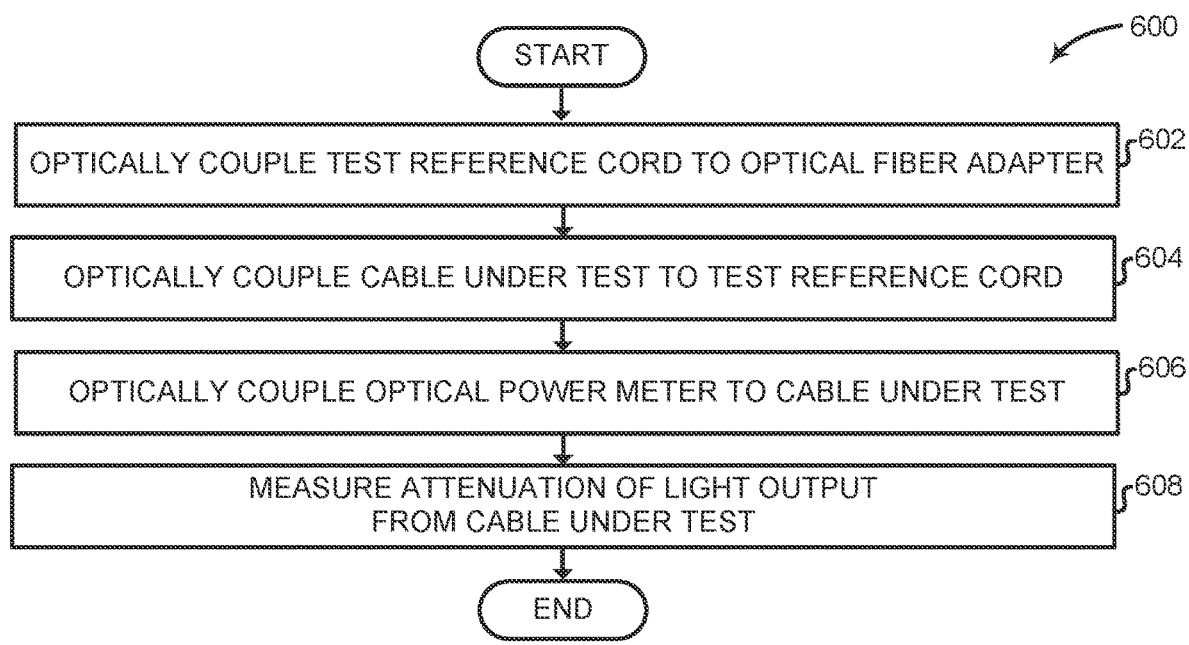
FIG. 6 is a flowchart of a method performed using the fiber optic test system shown in FIG. 2 according to one or more embodiments of the present disclosure.

At 516, the desired number of modes of light is output from the optical fiber adapter 126. For example, the technician causes the light source module 108 to provide a light output to the mode controller assembly 110, which causes the mode controller assembly 110 to output the desired number of modes of light to the BIMMF 120, which causes the BIMMF 120 to output the desired number of modes of light to the optical fiber connector 124, which causes the optical fiber connector 124 to output the desired number of modes of light to the optical fiber adapter 126, which causes the optical fiber adapter 126 to output the desired number of modes of light. The method 500 then ends. FIG. 6 is a flowchart of a method 600 performed using the fiber optic test system 200 shown in FIG. 2 according to one or more embodiments of the present disclosure. For example, the method 600 is performed during field testing of a cable under test. The method 600 begins at 602.

At 602, the first test reference cord 128a is optically coupled to the optical fiber adapter 126a of the first optical test device 202a. For example, a user optically couples the optical fiber connector 132a of the first test reference cord 128a to the optical fiber adapter 126a of the first optical test device 202a. The method 600 then proceeds to 604.

At 604, the first cable under test 208a is optically coupled to the first test reference cord 128a. For example, the user optically couples the optical fiber connector 212a of the first cable under test 208a to the optical fiber connector 134a of the first test reference cord 128a. The method 600 then proceeds to 606.

At 606, the optical power meter 204b of the second optical test device 202b is optically coupled to the first cable under test 208a. For example, the user optically couples the optical fiber adapter 206b, which is optically coupled to the optical power meter 204b included in the second optical test device 202b, to the optical fiber connector 222a of the first test receive cord 216a, and optically couples the optical fiber connector 220a of the first test receive cord 216a to the optical fiber connector 214a of the first cable under test 208a. The method 600 then proceeds to 608.

At 608, the attenuation of light output from the first cable under test 208a is measured. For example, the user causes the optical power meter 204b of the second optical test device 202b to measure the attenuation of light output from the first cable under test 208a. Based on the attenuation of light output from the first cable under test 208a measured by the optical power meter 204b of the second optical test device 202b, the user determines whether the first cable under test 208a has passed testing.

In one or more embodiments, the method 600 then ends. In one or more embodiments, the method 600 then returns to 602, and 602-608 are repeated for the second cable under test 208b.

The various embodiments described above can be combined to provide further embodiments. Aspects of the embodiments can be modified, if necessary to employ concepts of the various patents, applications and publications to provide yet further embodiments.

Embodiments disclosed herein may include any one or combination of the following features: a method of achieving a desired launch condition comprising optically coupling a light source module to a mode controller assembly that includes a non-bend-insensitive multimode fiber (non-BIMMF) positioned on a linear variable mandrel, selectively bending the non-BIMMF to output a desired number of modes of light from the mode controller assembly, optically coupling an optical fiber adapter to the mode controller assembly using a first bend-insensitive multimode fiber (first BIMMF), and outputting the desired number of modes of light from the optical fiber adapter; wherein the light source module and the mode controller assembly are mounted inside of the housing; wherein the light source module and the mode controller assembly are mounted to a printed circuit board disposed inside of the housing; wherein the selectively bending the non-BIMMF includes moving a plunger to selectively deform the non-BIMMF to output the desired number of modes of light from the mode controller assembly; wherein the optically coupling the optical fiber adapter to the mode controller includes optically coupling the optical fiber adapter to an optical fiber connector that is optically coupled to the mode controller, and wherein the method further comprises optically coupling an encircled flux measurement instrument to the optical fiber connector, and monitoring a launch condition output from the optical fiber connector using the encircled flux measurement instrument, wherein the selectively bending the non-BIMMF is based on the launch condition; further comprising optically coupling a test reference cord to the optical fiber adapter, where the test reference cord includes a second bend-insensitive multimode fiber (second BIMMF) having a diameter of 50±0.5 μm and a numerical aperture of 0.200±0.002, and two optical fiber connectors each have a loss of <0.1 dB, and outputting the desired number of modes of light from the test reference cord, where the non-BIMMF has a diameter of 50±1 μm, the first BIMMF has a diameter of 50±0.5 μm and a numerical aperture of 0.200±0.002, the non-BIMMF and the first BIMMF are fusion spliced together, and the optical fiber adapter has a loss of <0.1 dB; and/or further comprising optically coupling a test reference cord to the optical fiber adapter, optically coupling a cable under test to the test reference cord, optically coupling an optical power meter to the cable under test, and measuring, by the optical power meter, attenuation of light output from the cable under test.

Also, embodiments disclosed herein may include any one or combination of the following features: a fiber optic test device comprising a light source module, a mode controller assembly optically coupled to the light source module, the mode controller assembly including a non-bend-insensitive multimode fiber (non-BIMMF) positioned on a linear variable mandrel for selective bending of the non-BIMMF to output a desired number of modes of light from the mode controller assembly, and an optical fiber adapter optically coupled to the non-BIMMF of the mode controller assembly using a first bend-insensitive multimode fiber (first BIMMF), the optical fiber adapter, in operation, outputting the desired number of modes of light; further comprising a housing in which the light source module is mounted; wherein the mode controller assembly is mounted inside of the housing; further comprising a printed circuit board disposed inside of the housing, the light source module and the mode controller assembly being mounted to the printed circuit board; wherein the linear variable mandrel includes a plunger configured to adjustably deform the non-BIMMF to output the desired number of modes of light from the mode controller assembly; further comprising a test reference cord coupled to the optical fiber adapter, the test reference cord including a second bend-insensitive multimode fiber (second BIMMF) having a diameter of 50±0.5 μm and a numerical aperture of 0.200±0.002, and two optical fiber connectors each having a loss of <0.1 dB; and/or wherein the non-BIMMF has a diameter of 50±1 μm, the first BIMMF has a diameter of 50±0.5 μm and a numerical aperture of 0.200±0.002, and the non-BIMMF and the first BIMMF are fusion spliced together.

In addition, embodiments disclosed herein may include any one or combination of the following features: a fiber optic test system comprising a fiber optic test device including: a light source module, a mode controller assembly optically coupled to the light source module, the mode controller assembly including a non-bend-insensitive multimode fiber (non-BIMMF) positioned on a linear variable mandrel for selective bending of the non-BIMMF to output a desired number of modes of light from the mode controller assembly, and an optical fiber adapter optically coupled to the non-BIMMF of the mode controller assembly using a first bend-insensitive multimode fiber (first BIMMF), the optical fiber adapter, in operation, outputting the desired number of modes of light, and a test reference cord coupled to the optical fiber adapter, the test reference cord including a second bend-insensitive multimode fiber (second BIMMF); wherein the fiber optic test device includes a housing, and the light source module and the mode controller assembly are mounted inside of the housing; further comprising a printed circuit board disposed inside of the housing, the light source module and the mode controller assembly being mounted to the printed circuit board; wherein the linear variable mandrel includes a plunger configured to adjustably deform the non-BIMMF to output the desired number of modes of light from the mode; wherein the test reference cord includes two optical fiber connectors coupled to the second BIMMF, and wherein the non-BIMMF has a diameter of 50±1 μm, each of the first BIMMF and the second BIMMF has a diameter of 50±0.5 μm and a numerical aperture of 0.200±0.002, each of the optical fiber adapter and the optical fiber connectors has a loss of <0.1 dB, and the non-BIMMF and the first BIMMF are fusion spliced together; and/or further comprising an optical power meter including an optical fiber adapter configured to be optically coupled to a cable under test that is optically coupled to the test reference cord.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of achieving a desired launch condition, the method comprising:
   optically coupling a light source module to a mode controller assembly that includes a non-bend-insensitive multimode fiber (non-BIMMF) positioned on a linear variable mandrel;
   mounting the light source module and the mode controller assembly inside of a housing that encloses the light source module and the mode controller assembly;
   selectively bending the non-BIMMF to output a desired number of modes of light from the mode controller assembly;
   optically coupling an optical fiber connector to the mode controller assembly using a first bend-insensitive multimode fiber (first BIMMF); and
   optically coupling the optical fiber connector to a first end of an optical fiber adapter that is supported by the housing, the first end of the optical fiber adapter disposed inside of the housing and a second end of the optical fiber adapter disposed outside of the housing for outputting the desired number of modes of light.

2. The method according to claim 1, wherein the light source module, the mode controller assembly, and the first BIMMF are mounted to a printed circuit board disposed inside of the housing.

3. The method according to claim 1,
   wherein the selectively bending the non-BIMMF includes moving a plunger to selectively deform the non-BIMMF to output the desired number of modes of light from the mode controller assembly.

4. The method according to claim 1, further comprising:
   optically coupling an encircled flux measurement instrument to the optical fiber connector; and
   monitoring, by the encircled flux measurement instrument, a launch condition output from the optical fiber connector,
   wherein the selectively bending the non-BIMMF is based on the launch condition.

5. The method according to claim 1, further comprising:
   optically coupling a test reference cord to the second end of the optical fiber adapter that is disposed outside of the housing, the test reference cord including a second bend-insensitive multimode fiber (second BIMMF) having a diameter of 50±0.5 µm and a numerical aperture of 0.200±0.002, and two optical fiber connectors each having a loss of <0.1 dB; and
   outputting the desired number of modes of light from the test reference cord,
   wherein the non-BIMMF has a diameter of 50±1 µm, the first BIMMF has a diameter of 50±0.5 µm and a numerical aperture of 0.200±0.002, the non-BIMMF and the first BIMMF are fusion spliced together, and the optical fiber adapter has a loss of <0.1 dB.

6. The method according to claim 1, further comprising:
   optically coupling a test reference cord to the second end of the optical fiber adapter that is disposed outside of the housing;
   optically coupling a cable under test to the test reference cord;
   optically coupling an optical power meter to the cable under test; and
   measuring, by the optical power meter, attenuation of light output from the cable under test.

7. A fiber optic test device, comprising:
   a light source module;
   a mode controller assembly optically coupled to the light source module, the mode controller assembly including a non-bend-insensitive multimode fiber (non-BIMMF) positioned on a linear variable mandrel for selective bending of the non-BIMMF to output a desired number of modes of light from the mode controller assembly;
   a housing that encloses the light source module and the mode controller assembly;
   an optical fiber connector optically coupled to the non-BIMMF of the mode controller assembly using a first bend-insensitive multimode fiber (first BIMMF); and
   an optical fiber adapter supported by the housing, the optical fiber adapter having a first end that is disposed inside of the housing and a second end that is disposed outside of the housing, the first end of the optical fiber adapter optically coupled to the optical fiber connector, and the second end of the optical fiber adapter, in operation, outputting the desired number of modes of light.

8. The fiber optic test device according to claim 7, further comprising:
   a printed circuit board disposed inside of the housing, the light source module, the mode controller assembly, and the first BIMMF being mounted to the printed circuit board.

9. The fiber optic test device according to claim 7,
   wherein the linear variable mandrel includes a plunger configured to adjustably deform the non-BIMMF to output the desired number of modes of light from the mode controller assembly.

10. The fiber optic test device according to claim 7, further comprising:
    a test reference cord coupled to the second end of the optical fiber adapter, the test reference cord including a second bend-insensitive multimode fiber (second BIMMF) having a diameter of 50±0.5 µm and a numerical aperture of 0.200±0.002, and two optical fiber connectors each having a loss of <0.1 dB.

11. The fiber optic test device according to claim 10,
    wherein the non-BIMMF has a diameter of 50±1 µm, the first BIMMF has a diameter of 50±0.5 µm and a numerical aperture of 0.200±0.002, and the non-BIMMF and the first BIMMF are fusion spliced together.

12. A fiber optic test system, comprising:
    a fiber optic test device including:
      a light source module;
      a mode controller assembly optically coupled to the light source module, the mode controller assembly including a non-bend-insensitive multimode fiber (non-BIMMF) positioned on a linear variable mandrel for selective bending of the non-BIMMF to output a desired number of modes of light from the mode controller assembly;
      a housing that encloses the light source module and the mode controller assembly;
      an optical fiber connector optically coupled to the non-BIMMF of the mode controller assembly using a first bend-insensitive multimode fiber (first BIMMF); and
      an optical fiber adapter supported by the housing, the optical fiber adapter having a first end that is disposed inside of the housing and a second end that is disposed outside of the housing, the first end of the optical fiber adapter optically coupled to the optical fiber connector, and the second end of the optical fiber adapter, in operation, outputting the desired number of modes of light; and a test reference cord coupled to the second end of the optical fiber adapter that is disposed outside of the housing, the test reference cord including a second bend-insensitive multimode fiber (second BIMMF).

13. The fiber optic test system according to claim 12, further comprising:

a printed circuit board disposed inside of the housing, the light source module, the mode controller assembly, and the first BIMMF being mounted to the printed circuit board.

14. The fiber optic test system according to claim 12, wherein the linear variable mandrel includes a plunger configured to adjustably deform the non-BIMMF to output the desired number of modes of light from the mode.

15. The fiber optic test system according to claim 12, wherein the test reference cord includes two optical fiber connectors coupled to the second BIMMF, and wherein the non-BIMMF has a diameter of 50±1 μm, each of the first BIMMF and the second BIMMF has a diameter of 50±0.5 μm and a numerical aperture of 0.200±0.002, each of the optical fiber adapter and the optical fiber connectors has a loss of <0.1 dB, and the non-BIMMF and the first BIMMF are fusion spliced together.

16. The fiber optic test system according to claim 12, further comprising:

an optical power meter including an optical fiber adapter configured to be optically coupled to a cable under test that is optically coupled to the test reference cord.

* * * * *